(12) United States Patent
Nishioki (10) Patent No.: US 6,198,298 B1
(45) Date of Patent: Mar. 6, 2001

(54) TOUCH-SIGNAL PROBE

(75) Inventor: Nobuhisa Nishioki, Tsukuba (JP)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 09/220,060

(22) Filed: Dec. 23, 1998

(30) Foreign Application Priority Data

Dec. 24, 1997 (JP) ................................. 9-354874

(51) Int. Cl.[7] ............................................. G01B 21/20
(52) U.S. Cl. .................... 324/754; 324/158.1; 324/756
(58) Field of Search .................................. 324/754, 755, 324/158.1, 73.1, 756

(56) References Cited

U.S. PATENT DOCUMENTS 5,315,237 * 5/1994 Iwadura et al. ................... 324/158.1

FOREIGN PATENT DOCUMENTS

| 0764827A2 | * 3/1997 | (EP) | ................. G01B/5/016 |
|---|---|---|---|
| 2238616 | * 10/1990 | (GB) | ................. G01B/21/20 |
| 64-69910 | 3/1989 | (JP) | . |
| 6-34311 | 2/1994 | (JP) | . |
| 6-221806 | 8/1994 | (JP) | . |
| 10-176902 | 6/1998 | (JP) | . |

* cited by examiner

*Primary Examiner*—Safet Metjahic
*Assistant Examiner*—Jimmy Nguyen
(74) *Attorney, Agent, or Firm*—McDermott, Will & Emery (57) ABSTRACT

The stylus support (10) has a center consonant with an origin of a plurality of axes, a stylus (13) on a side thereof and a vibrating/detecting element (12) disposed outside a surface perpendicular to an axis. A fitting portion (14) for fitting a probe body (15) is formed to the stylus support (10) and an aperture (17) is penetrated around the fitting portion (14) along the axis, so that the vibration of the stylus support (10) is isolated from a periphery of a fitted position of the probe body (15). Accordingly, an outer portion of the stylus support (10) outside the aperture (17) can be vibrated freely from the probe body (15) to allow the stylus (13) to vibrate sufficiently for improving accuracy.

14 Claims, 6 Drawing Sheets

TOUCH-SIGNAL PROBE

BACKGROUND OF THE INVENTION

1. Field of the Invention

The present invention relates to a touch-signal probe adapted to be used in a coordinate measuring machine, a machine tool and the like for measuring a configuration of a workpiece. More specifically, it relates to a vibrating touch-signal probe having improved sensitivity.

2. Description of Related Art

Conventionally, a height-gauge (linear measuring machine), a coordinate measuring machine, a contour measuring machine and the like are known as a measuring machine for measuring a configuration and a dimension of a workpiece. A touch-signal probe which detects a contact to a workpiece is employed in respective machines for detecting a coordinate and a position of the workpiece.

One simple way for detecting the touch of the touch-signal probe is to provide a contact portion for touching the workpiece at a tip end of an approximately cylindrical stylus to detect an opposing force caused by the touch. On the other hand, a vibrating touch-signal probe is also used, where a vibrating/detecting element is provided to the stylus to vibrate the stylus in advance and to detect a change of the vibration according to the touch. In the vibrating touch-signal probe, the vibration is changed, restrained for example, by the workpiece when the contact portion touches the workpiece. Accordingly, the contact can be detected by monitoring the vibration of the stylus to detect the change of the vibration.

The stylus of the vibrating touch-signal probe is preferably arranged radially. Especially, the stylus is most preferably arranged crosswise.

Figure 4:
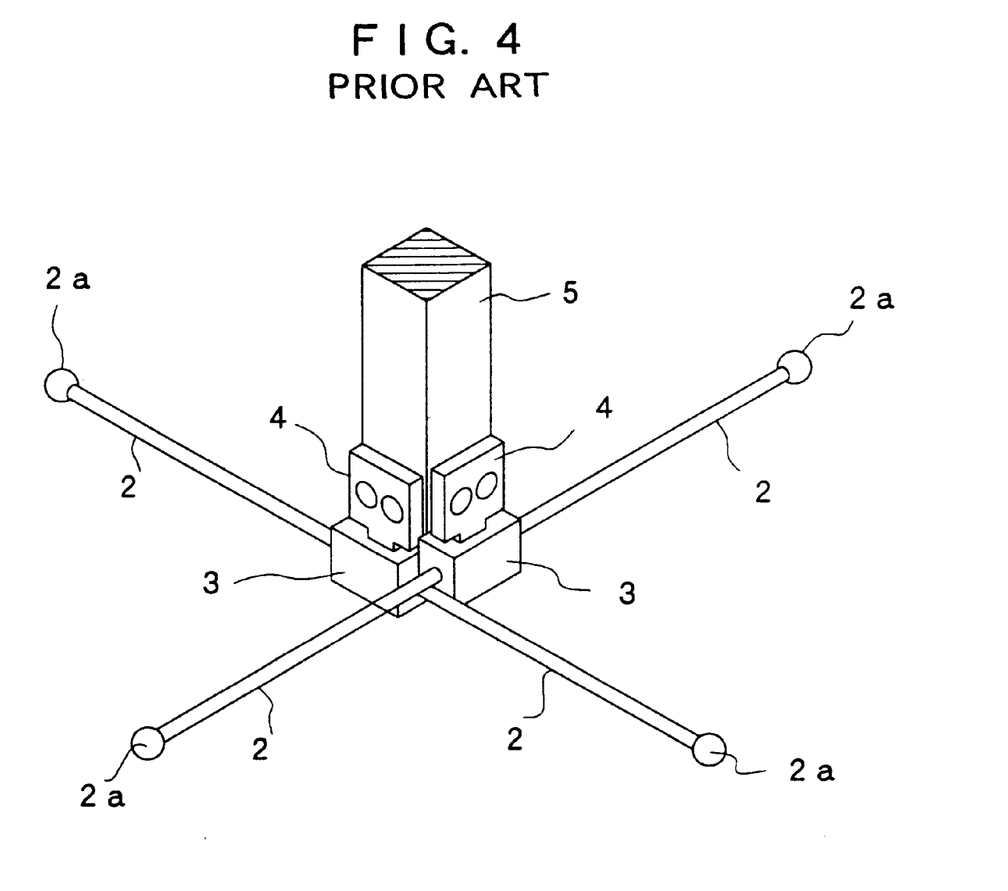
FIG. 4 is a perspective view showing a conventional touch-signal probe.

FIG. 4 shows a conventional vibrating touch-signal probe having styluses arranged crosswise. The touch-signal probe has a pair of stylus support 3 combined in X and Y-axis direction having a stylus 2 protruded thereon, a piezoelectric element 4 provided on an upper side of the respective stylus support 3 and a probe body 5 as a probe axis having the respective stylus supports 3 attached at a tip end thereof. A contact ball 2a provided at a tip end of the respective styluses 2 is abutted to the workpiece while the styluses 2 are vibrated by the piezoelectric element 4 to detect vibration change.

However, the contact ball 2a at the tip end of the stylus 2 is provided at a different height and can not be arranged at an identical level, since the stylus 2 is combined crosswise by stacking a pair of stylus 2. Accordingly, the vibrating touch-signal probe is difficult to use and is difficult to reduce size thereof.

In view of above disadvantage, a vibrating touch-signal probe having a contact ball at the tip end of the stylus arranged coplanar has been strongly desired. In response, the applicant has proposed a structure in which the stylus support of the touch-signal probe is vibrated on an identical level in a radial direction (Japanese Patent Application No. Hei 8-336986).

Figure 5:
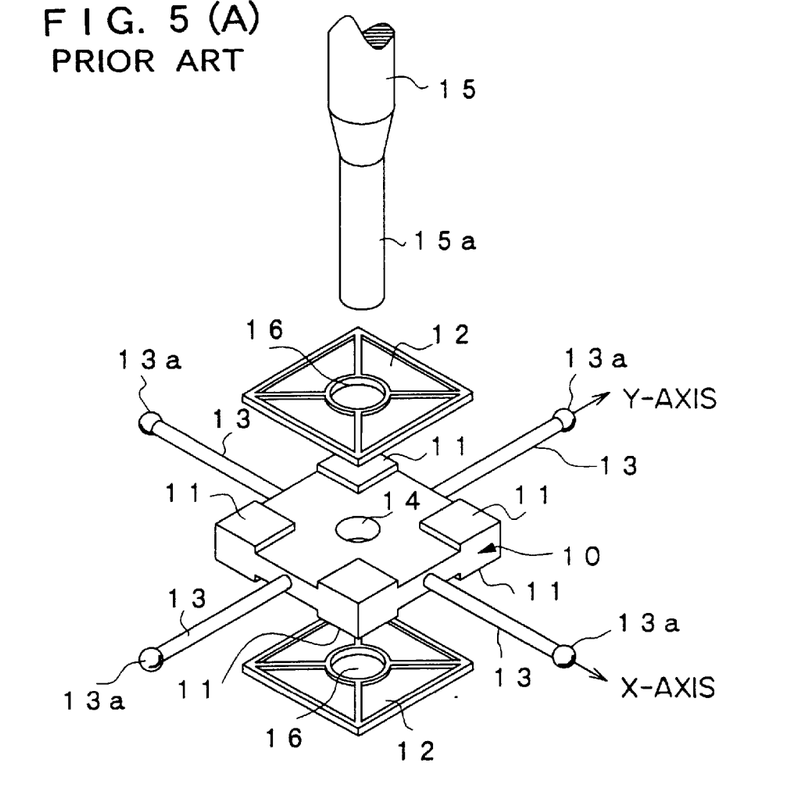
FIG. 5(a) is an exploded perspective view showing a touch-signal probe related to the present invention.
FIG. 5(b) is a perspective view thereof.
Figure 6:
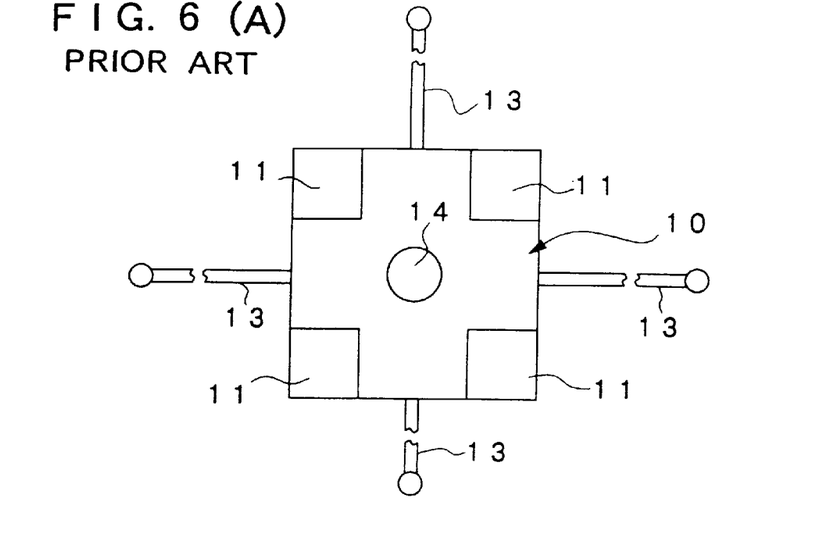
FIG. 6(a) is a top plan view showing a touch-signal probe shown in FIG. 5.
FIG. 6(b) and FIG. 6(c) are top plan views showing deformation when a vibration is applied.

FIGS. 5(a), (b) and FIG. 6(a) shows a specific structure of the touch-signal probe proposed by the applicant.

A center of the stylus support 10 corresponds to the origin of X, Y and Z-axis. The stylus support 10 has a square X-Y plane and is a flat block. A pair of vibrating/detecting element 12 composed of a piezoelectric element is bonded to a locating projection 11 protruded on four corners of an upper and a lower surface of the stylus support 10. A total of four styluses 13 are provided on a center of respective sides of the stylussupport, the styluses being symmetrical and corresponding to X and Y-axis directions respectively.

The stylus support 10 is supported by fitting a tip end 15a of a probe body 15 extending in Z-axis direction to a fitting hole 14 penetrating through the plane center of the stylus support 10.

An insert hole 16 having sufficiently larger inner diameter than an outer diameter of the tip end 15a is formed at a center of respective vibrating/detecting element 12 to prevent the vibrating/detecting element 12 from being interfering with the probe body 15.

According to the above arrangement, a cross-shaped touch sensor having the ball-shaped contact portion 13a at the tip end of the respective styluses 13 disposed coplanar can be obtained, of which mechanism is simple and is adapted to size reduction.

However, according to the touch-signal probe structure shown in FIGS. 5(a), (b) and FIG. 6(a), the stylus support 10 deforms to be stretched and contracted in a radial direction (diametral direction relative to a central axis line of the probe body 15) as shown in FIGS. 6(b) and 6(c) when the vibrating/detecting element 12 is vibrated.

Accordingly, when the stylus support 10 is attached by fitting the probe body 15 to the fitting hole 14, the deformation of the stylus support 10 is hindered by the fitted probe body 15 and sufficient vibration can not be maintained. In other words, though the stylus support 10 has to be sufficiently vibrated for sharply sensing the contact to the workpiece, the stylus support 10 can not be vibrated for being fitted to the probe body 15 as mentioned above. Therefore, sensing accuracy can be deteriorated.

SUMMARY OF THE INVENTION

An object of the present invention is to provide enough vibration in a vibrating touch-signal probe having a stylus vibrating in a radial direction on a same level, thereby enhancing sensitivity thereof.

For the object, an aperture for isolating a vibration of a stylus support from a periphery of a fitted position of a probe body is provided around a fitting portion provided to the stylus support.

Specifically, the touch-signal probe according to the present invention has a probe body, a stylus support provided at a tip end of the probe body, a stylus which has a contact portion for abutting the workpiece at a tip end thereof and is projected from and supported by the stylus support and a vibrating/detecting element for vibrating the stylus at a frequency approximately identical with a natural frequency of the stylus and for detecting a change in vibration with a contact of the contact portion to the workpiece.

The touch-signal probe is characterized in that a fitting portion for fitting the probe body is formed on the stylus support and in that an aperture is provided around the fitting portion to isolate a periphery of a fitted position of the probe body from the vibration of the stylus support.

According to the above arrangement, the stylus is vibrated for measurement in advance by the vibrating/detecting element through the stylus support. And the touch signal-probe is moved to abut the workpiece. When the contact portion of the stylus abuts the workpiece, the vibration of the stylus is restrained, so that the vibrating state is detected by the vibrating/detecting element to detect the contact to the workpiece.

The stylus support is vibrated at a stylus supporting portion (a portion of the stylus support outside the aperture). The vibration is absorbed by the aperture and is isolated from the periphery of the fitted position of the probe body (a portion of the stylus support inside the aperture) and the probe body. Accordingly, when the stylus support is fixed and supported by the probe body, a deformation of the stylus support is not hindered and sufficient vibration of the stylus can be obtained to conduct measurement with high accuracy without deteriorating contact sensitivity.

Further, since the stylus can be disposed on a same level, the size of the touch-signal probe can be reduced even if the stylus is supported in four directions.

The stylus supporting portion of the stylus support and the periphery of the fitted position of the probe body may preferably be opposed with the aperture therebetween and may preferably be connected by a resilient hinge which is disposed at a node of vibration of the stylus support.

According to the above arrangement, since the resilient hinge is positioned at a node of the vibration of the stylus support, the stylus support can be vibrated while the stylus support being supported relative to the periphery of the fitted position of the probe body. In other words, the vibration of the stylus or the stylus support caused by the vibrating/detecting element is absorbed by a deformation of the resilient hinge and is not hindered by the periphery of the fitted position on the stylus support and the probe body, thereby making the touch-signal probe further adapted to a highly accurate measurement.

The stylus according to the present invention is preferably projected and supported at an antinode of the vibration of the stylus support. According to the above arrangement, the stylus is vibrated in a radial direction (axis direction of the stylus) on the same level by the vibration of the stylus support.

Alternatively, the stylus may preferably be projected and supported at a node of the vibration of the stylus support. Accordingly, the portion supporting the stylus is swung with a vibration of the antinode of the vibration adjacent thereto, and the contact portion at the tip end of the stylus is vibrated in an arc direction. Therefore, the touch signal probe can detect the contact to the workpiece more sensitively than the vibration in the radial direction (axis-direction of the stylus) according to a contact direction of the touch-signal probe to the workpiece.

According to the present invention, the stylus support may be an approximate rectangular solid having a square cross section orthogonal to a central axis of the probe body.

According to the above arrangement, since the center of the stylus support can be easily accorded to the origin of the plurality of the axes, the assembling of the touch-signal probe can be facilitated.

Alternatively, the stylus support may also be an approximate cylinder having a circular cross section orthogonal to a central axis of the probe body.

According to the above arrangement, the resilient hinge can be disposed to the stylus support at a position other than a fitting position of the vibrating/detecting element which has the greatest rigidity.

DETAILED DESCRIPTION OF PREFERRED EMBODIMENT(S)

Preferred embodiments according to the present invention are described below with reference to the attached drawings. In the embodiments, identical signs are put to identical components to omit or simplify the description.

Figure 1:
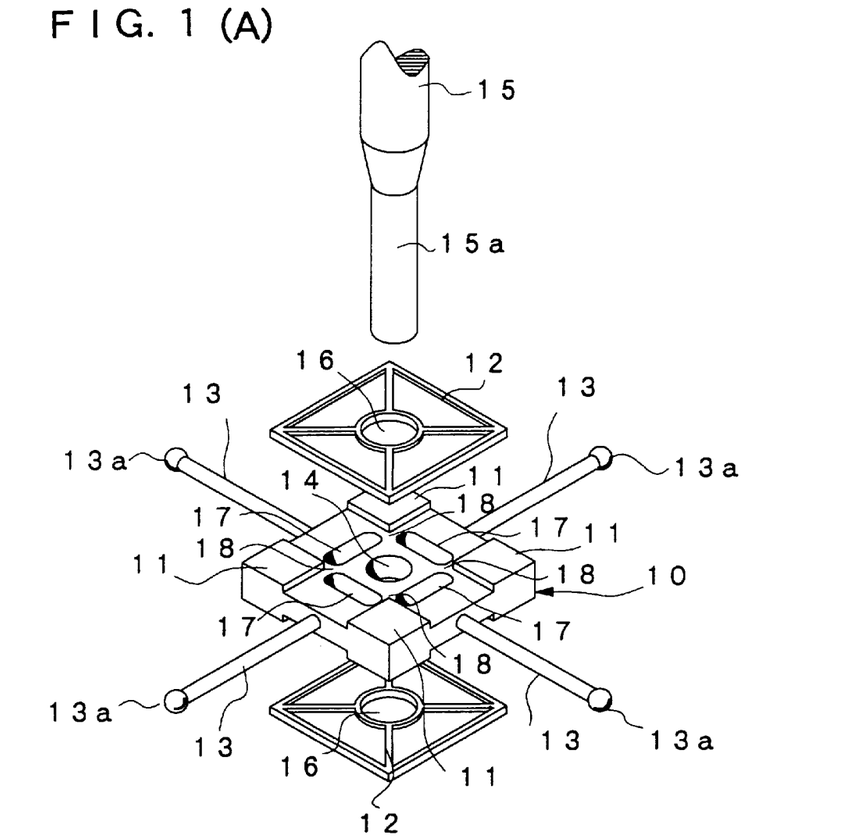
FIG. 1(a) is an exploded perspective view showing a touch-signal probe according to first embodiment of the present invention.
FIG. 1(b) is a perspective view of the touch-signal probe.
Figure 2:
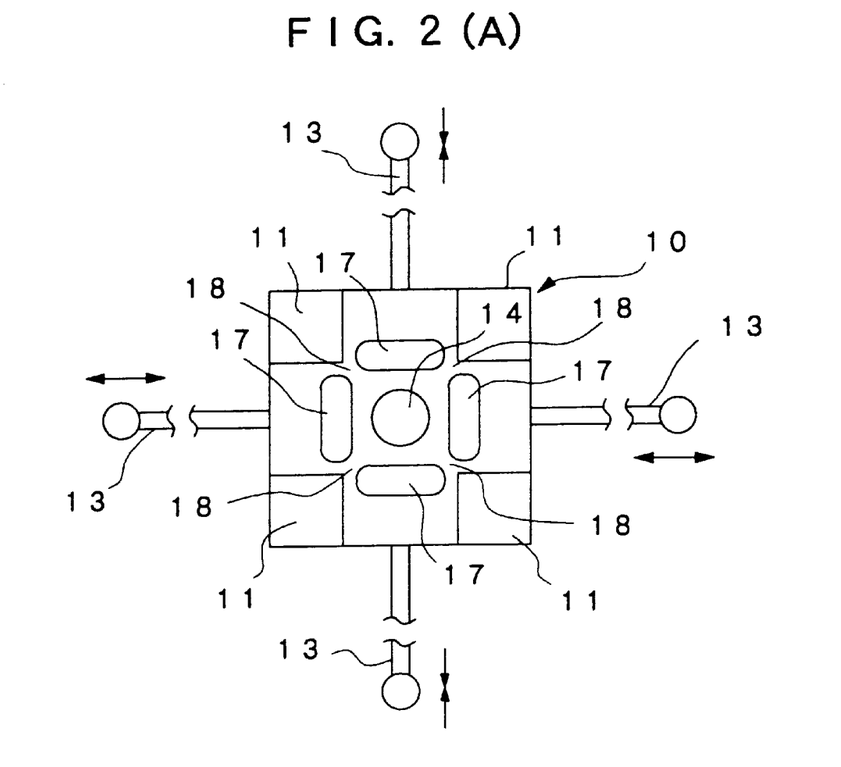
FIG. 2(a) is a top plan view of the touch-signal probe.
FIG. 2(b) and FIG. 2(c) are top plan views showing a deformation when a vibration is applied.

FIG. 1 and FIG. 2 show first embodiment according to the present invention. Incidentally, since basic structure of the first embodiment is the same as the conventional structure shown in FIG. 6, identical signs are put to identical parts and different signs are put only to newly added parts.

FIG. 1(a) is an exploded perspective view showing a touch-signal probe according to a first embodiment of the present invention, FIG. 1(b) is a perspective view showing the touch-signal probe and FIG. 2(a) is a top plan view of the touch-signal probe.

In these figures, center of the stylus support 10 corresponds to the origin of X, Y and Z-axis. The stylus support 10 has a square X-Y plane and is a flat block. A pair of piezoelectric element 12 as a vibrating/detecting element is bonded to a locating projection 11 protruded on four corners of an upper and a lower surface of the stylus support 10. A total of four styluses 13 are provided on a center of respective side, the styluses being symmetrical and corresponding to X and Y-axis directions respectively.

The piezoelectric element 12 is a plate piezoelectric material having a square plane and a rib along periphery and diagonal thereof, the rib encircling four surface-electrodes formed thereinside. A back side of the piezoelectric element 2 is a common electrode covering approximately the entire surface thereof. Accordingly, four sections sandwiched between the respective surface-electrodes and the common electrode on the back side works as a piezoelectric element. In other words, the piezoelectric material of any one of the sections is stretched and contracted by applying an electric voltage between the surface-electrode and the common electrode, or, alternatively, an electric voltage in accordance with stretch and contraction is generated by stretching and contracting the sections by an external force.

The surface-electrode of the piezoelectric element 12 has a pair of opposing vibrating electrode for vibrating the stylus 13 in an axis direction (radial direction) and a pair of opposing detecting electrode for detecting the vibration. In other words, electric voltage is applied to any one of the opposing pair of electrode from an external actuating circuit to vibrate the piezoelectric element 12 with an edge of the piezoelectric element 12 as an antinode and a vertex thereof as a node. On the other hand, a detecting circuit is connected to the other pair of electrodes to detect a deformation received when the piezoelectric element 12 is vibrated. Conventional structure, shown in Japanese Patent Application No. Hei 6-221806 for example, can be adopted for the actuating circuit and the detecting circuit.

The vertex portion of the piezoelectric element 12 to be the node of vibration is bonded to the locating projection 11 of the stylus support 10. When the piezoelectric element 12 is vibrated, the edge of the piezoelectric element 12 is vibrated as the antinode and the vertex portion is vibrated to swing right and left, so that the swing is transmitted to the locating projection 11 to cause a vibration to the stylus support 10 with an outer side of the aperture 17 being an antinode of the vibration.

Alternatively, a plurality of (four, for example) independent piezoelectric element may be employed and each element may be used exclusively for vibrating or detecting.

According to the aforesaid embodiment, since the stylus 13 vibrates in an axis direction thereof, the sensitivity is the most excellent when the stylus 13 contacts the workpiece in a direction corresponding to the axis direction.

The stylus support 10 is supported by fitting a tip end 15a of the probe body 15 extending in Z-axis direction to a fitting hole 14 penetrated through the plane center of the stylus support 10. The fitting hole 14 is a fitting portion, which may be provided as a non-penetrating hole formed on the stylus support 10 in the present invention.

An insert hole 16 having sufficiently larger inner diameter than an outer diameter of the tip end 15a is provided at the center of the piezoelectric element 12 to prevent the piezoelectric element 12 from being interfering with the probe body 15.

Four elongated apertures 17 penetrating from top to bottom (Z-axis direction) are provided on a periphery of the fitting hole 14 of the stylus support 10 along respective edges of the stylus support 10. The stylus support 10 is composed of a fitting peripheral portion (an inner part of the stylus support 10 to the aperture 17) and a stylus supporting portion (an outer part of the stylus support 10 to the aperture 17) which are provided opposingly with the aperture 17 therebetween and are mutually connected by a resilient hinge 18.

The resilient hinge 18 is located at a position to be a node of the vibration when the stylus supporting portion of the stylus support 10 is vibrated.

Incidentally, the stylus 13 is supported at a position to be an antinode (an intermediate position of the nodes of the vibration) of the vibration when the stylus supporting portion of the stylus support 10 is vibrated.

The stylus supporting portion provided on outer side of the stylus support 10 is deformed to stretch and contract in a radial direction as shown in FIGS. 2(b) and (c) with vibration by the piezoelectric element 12. Accordingly, the stylus 13 supported at the antinode of the vibration of the stylus supporting position is vibrated to advance and retreat in the axis direction thereof.

The aperture 17 absorbs the deformation by the vibration. Furthermore, since the stylus supporting portion and the fitting peripheral potion are connected by the resilient hinge 18 provided at a position where the vibration is the least, the resilient hinge elastically deforms to absorb the rotative deforming component around a central axis, so that the vibration is blocked between the stylus support 10 and the probe body 15. Accordingly, the stylus 13 is sufficiently vibrated without being hindered by the probe body 15 and high accuracy for touch-signal probe can be obtained.

As described above, the stretch and contraction of outer side with the vibration of the stylus support 10 is absorbed by the aperture 17 and the vibration is isolated relative to the probe body 15. Accordingly, the vibration of the vibrating touch-signal probe in the radial direction is not hindered and does not affect to the vibration property of the probe. Furthermore, since the deformation of the stylus support 10 is not hindered if the stylus support 10 is fixedly supported by the probe body 15, the measurement accuracy can be improved.

Since the stylus 13 can be disposed on an identical level, the size of the touch-signal prove can be made smaller even though the stylus is attached in four directions.

Since the portion deforming by vibrating the stylus support 10 is functionally independent of the portion for supporting the vibrating/detecting element (piezoelectric element) 12, the touch-signal probe can be considerably freely designed, which allows a desirable configuration and dimension which does not impair vibration property.

Since the four apertures deform to absorb the vibration when the stylus 13 is vibrated by the vibrating/detecting element 12 and the resilient hinge 18 is located at the node of the vibration, the vibration generated by the vibrating/detecting element 12 is not transmitted to the periphery of the fitted position of the stylus support 10.

Accordingly, the circumference of the fitting position is not deformed and the vibration is not transmitted to the probe body 15, thereby conducting highly accurate measurement.

Since the stylus support 10 is the rectangular solid having square X-Y plane, the center of the stylus support 10 can be easily made consonant with the origin of X, Y and Z-axis, thereby facilitating assembling work of the touch-signal probe.

Second embodiment according to the present invention is described below with reference to FIG. 3.

The second embodiment is different from the first embodiment in plane configuration of vibrating/detecting element and stylus support, and the rest of the structure is identical with the first embodiment.

Figure 3:
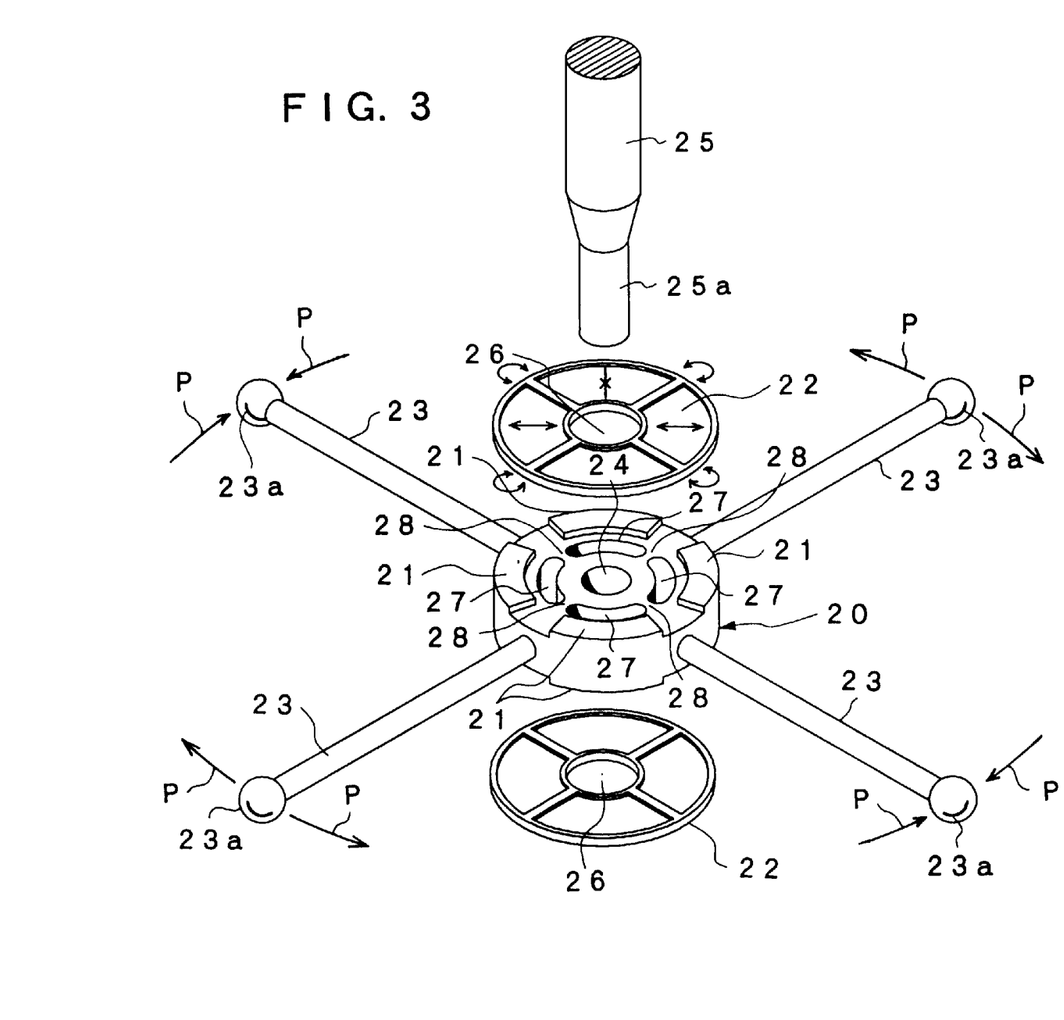
FIG. 3 is an exploded perspective view showing a touch-signal probe according to second embodiment of the present invention.

In FIG. 3, the stylus support 20 is a short cylindrical block having disk-shaped X-Y plane, the center being corresponding to the origin of X, Y and Z-axis. A flat piezoelectric element 22 having disc-shape plane as a flat vibrating/detecting element is bonded respectively to a locating projection 21 projected on respective four portions of the upper surface and lower surface. A total of four styluses 23 composed of a pair of first styluses and a pair of second styluses respectively corresponding to X-axis direction and Y-axis direction are provided on a center of a side surface. A contact portion 23a abutting the workpiece is provided on a tip end thereof. The stylus 23 is attached to a position to be an antinode of a vibration of the stylus support 20.

The piezoelectric element 22 has flat circular shape unlike the first embodiment. However, the surface-electrodes of four sections and the common electrode on the back side are similarly formed. The four sections are similarly divided as a pair of vibrating section and another pair of detecting section, and a partition of the surface-electrodes is also similarly positioned to be a node of vibration with an antinode of vibration therebetween. In the present embodiment, the antinode of the vibration of the piezoelectric element 22 is bonded to the locating projection 21 of the stylus support 20 and the vibration is transmitted as a reciprocating movement of this portion. The reciprocating movement is transmitted to let a portion of the stylus support 20 outside an aperture 27 to vibrate as an antinode. The resilient hinge 28 is set as a node of vibration to turn right and left, thereby vibrating the contact portion 23a at the tip end of the stylus 23 in a rotating direction of the Z-axis (arrow P direction).

In the second embodiment, the sensitivity is the most excellent when the stylus 23 touches the workpiece in a direction perpendicular to the axis direction of the stylus 23.

The stylus support 20 is supported by fitting a tip end 25a of the probe body 25 extending in the Z-axis direction to a fitting hole 24 penetrating through a plane center of the stylus support 20. The fitting hole 24 is a fitting portion, which may be provided as a non-penetrating hole formed on the stylus support 20 in the present invention. An insert hole 26 having sufficiently larger inner diameter than an outer diameter of the tip end 25a is provided at the center of the piezoelectric element 22 to prevent the piezoelectric element 22 from being interfering with the probe body 25. Four elongated apertures 27 penetrating from top to bottom are provided on a periphery of the fitting hole 24. Resilient hinges 28 provided between respective apertures 27 connect a peripheral portion of the stylus support 20 and a circumference of the fitting hole 24 on four portions. The resilient hinge 28 is positioned at the node of vibration of the stylus support 20.

Though the stylus 13 of the first embodiment is projected and supported at a position to be an antinode of the vibration of the stylus support 10, the stylus 23 of the second embodiment is projected and supported at a position to be a node of the vibration of the stylus support 20.

Accordingly, similar effect (except for the effect of the square stylus support) to the first embodiment can be obtained in the second embodiment.

In both of the first and second embodiment, since the stylus 13, 23 vibrates at a frequency approximately identical with a natural frequency of the stylus 13 and 23, and since the stylus 13 and 23 is unlikely to be effected by a disturbance vibration on account of existence of the apertures 17 and 27 and the resilient hinges 18 and 28, the vibration can be detected stably. Accordingly, a vibrating touch-signal probe adapted for sensitive high-precision measurement can be obtained.

Furthermore, as shown in FIG. 3, since the resilient hinge 28 is disposed on the stylus support 20 away from the position of the locating projection 21 having greatest rigidity and the stylus 23 is disposed at a position to be a node of vibration of the stylus support 20, the stylus 23 can be more easily vibrated.

The scope of the present invention is not restricted to the embodiment described above, but includes following modifications as long as the object of the present invention can be attained.

Though the piezoelectric elements 12 and 22 are employed as the vibrating/detecting element in the above embodiments, other actuators can be used in the present invention.

The present invention is applied to an ultrasonic resonant touch sensor disclosed in Japanese Patent Application No. Hei 6-221806. However, the present invention is not limited to be applied to the ultrasonic resonant touch sensor but may be applied to a piezoelectric sensor shown, for example, in Japanese Patent Application No. Sho 64-69910 or may be applied to a sensor shown, for example, in Japanese Patent Application No. Hei 6-34311.

The styluses 13 and 23 are composed of the pair of the first stylus extending in X-axis direction symmetrically with each other and the pair of the second stylus extending in Y-axis direction symmetrically with each other, thus totaling four styluses. However, the arrangement of the styluses in the present invention is not limited to the above arrangement.

For example, the styluses 13 and 23 can be composed of one first stylus or two first styluses extending along the X-axis or one second stylus or two second styluses extending along the Y-axis. Further, third stylus extending along the Z-axis can also be employed.

What is claimed is:

1. A touch-signal probe for detecting a contact to a workpiece, comprising:

a probe body; a stylus support provided at a tip end of the probe body; a stylus projecting from and supported by the stylus support, the stylus having a contact portion for abutting the workpiece at a tip end thereof; and a vibrating/detecting element for vibrating the stylus at a frequency approximately identical to a natural frequency of the stylus and for detecting a change in vibration with a contact of the contact portion of the workpiece, wherein a fitting portion for fitting the probe body is formed on the stylus support;

wherein an aperture is provided around the fitting portion and extending completely through the fitting portion; and wherein, the aperture allows a portion of the stylus support to deform and absorb vibration and isolate a periphery of a fitted position of the probe body from the vibration of the stylus support.

2. The touch-signal probe according to claim 1, the stylus support further comprising a stylus supporting portion opposed to the periphery of the fitted position of the probe body with the aperture therebetween, the stylus supporting portion and the periphery of the fitted position of the probe body being connected by a resilient hinge which is disposed at a node of vibration of the stylus support.

3. The touch-signal probe according to claim 1, wherein the stylus is projected and supported at an antinode of the vibration of the stylus support.

4. The touch-signal probe according to claim 1, wherein the stylus is projected and supported at a node of the vibration of the stylus support.

5. The touch-signal probe according to claim 2, wherein the stylus is projected and supported at an antinode of the vibration of the stylus support.

6. The touch-signal probe according to claim 2, wherein the stylus is projected and supported at a node of the vibration of the stylus support.

7. The touch-signal probe according to claim 1, wherein the stylus support is an approximate rectangular solid having a square cross section orthogonal to a central axis of the probe body.

8. The touch-signal probe according to claim 1, wherein the stylus support is an approximate cylinder having a circular cross section orthogonal to a central axis of the probe body.

9. The touch-signal probe according to claim 2, wherein the stylus support is an approximate rectangular solid having a square cross section orthogonal to a central axis of the probe body.

10. The touch-signal probe according to claim 2, wherein the stylus support is an approximate cylinder having a circular cross section orthogonal to a central axis of the probe body.

11. The touch-signal probe according to claim 1, wherein the stylus has a pair of first stylus symmetrically disposed on first axis-line passing a center of the stylus support and another pair of second stylus symmetrically disposed on second axis-line orthogonal to the first axis-line passing through the center of the stylus support.

12. The touch-signal probe according to claim 2, wherein the stylus has a pair of first stylus symmetrically disposed on first axis-line passing a center of the stylus support and another pair of second stylus symmetrically disposed on second axis-line orthogonal to the first axis-line passing through the center of the stylus support.

13. The touch-signal probe according to claim 9, wherein the stylus has a pair of first stylus symmetrically disposed on first axis-line passing a center of the stylus support and another pair of second stylus symmetrically disposed on second axis-line orthogonal to the first axis-line passing through the center of the stylus support.

14. The touch-signal probe according to claim 10, wherein the stylus has a pair of first stylus symmetrically disposed on first axis-line passing a center of the stylus support and another pair of second stylus symmetrically disposed on second axis-line orthogonal to the first axis-line passing through the center of the stylus support.

\* \* \* \* \*